(12) United States Patent
Yasui et al.

(10) Patent No.: US 12,227,644 B2
(45) Date of Patent: Feb. 18, 2025

(54) POLYAMIDE RESIN COMPOSITION

(71) Applicant: UBE Corporation, Ube (JP)

(72) Inventors: Tetsuya Yasui, Ube (JP); Akane Sakamoto, Ube (JP); Yuki Suedomi, Ube (JP); Hitoshi Kodama, Ube (JP); Kosuke Oishi, Ube (JP); Takashi Kumagai, Ube (JP); Mikako Fujita, Ube (JP)

(73) Assignee: UBE CORPORATION, Ube (JP)

( * ) Notice: Subject to any disclaimer, the term of this patent is extended or adjusted under 35 U.S.C. 154(b) by 172 days.

(21) Appl. No.: 17/912,219

(22) PCT Filed: Mar. 19, 2021

(86) PCT No.: PCT/JP2021/011384
§ 371 (c)(1),
(2) Date: Sep. 16, 2022

(87) PCT Pub. No.: WO2021/187617
PCT Pub. Date: Sep. 23, 2021

(65) Prior Publication Data
US 2023/0203305 A1    Jun. 29, 2023

(30) Foreign Application Priority Data

Mar. 19, 2020 (JP) ................ 2020-049048

(51) Int. Cl.
*B32B 7/10*    (2006.01)
*B29C 45/00*    (2006.01)
(Continued)

(52) U.S. Cl.
CPC .......... *C08L 77/02* (2013.01); *B29C 45/0001* (2013.01); *B32B 7/10* (2013.01);
(Continued)

(58) Field of Classification Search
CPC ................. C08L 77/02; C08L 2203/30; C08L 2205/025; C08L 2205/035; C08L 91/06;
(Continued)

(56) References Cited

U.S. PATENT DOCUMENTS

| 5,492,980 A | 2/1996 | Moriwaki |
| 2002/0197495 A1 | 12/2002 | Tamura et al. |

(Continued)

FOREIGN PATENT DOCUMENTS

| CN | 102996921 B | 4/2015 |
| CN | 104592749 A | 5/2015 |

(Continued)

OTHER PUBLICATIONS

International Search Report (PCT/ISA/210) issued in PCT/JP2021/011383, dated May 11, 2021.
(Continued)

*Primary Examiner* — John D Freeman
(74) *Attorney, Agent, or Firm* — Birch, Stewart, Kolasch & Birch, LLP

(57) ABSTRACT

The present invention relates to a polyamide resin composition that is excellent in mechanical characteristics, bonding properties and calcium chloride resistance and is suitably bonded to an acid-modified polyolefin, wherein the polyamide resin composition includes 70 to 99 mass % of an aliphatic polyamide resin (A) having an amino group concentration of 46 to 110 μmol/g, 0 to 18 mass % of an aromatic polyamide resin (B), 0.01 to 0.50 mass % of a polyalkylene glycol alkyl ether (C), 0.01 to 0.50 mass % of a polyolefin wax (D) and 0 to 22.98 mass % of a component (E) other than (A) to (D), and the total of (A) to (E) is 100 mass %, and wherein the acid-modified polyolefin having an amount of acid modification of 8 to 100 μmol/g.

10 Claims, 1 Drawing Sheet

(51) Int. Cl.
  *B29C 45/16* (2006.01)
  *B32B 27/32* (2006.01)
  *B32B 27/34* (2006.01)
  *C08L 77/02* (2006.01)
  *B29K 71/00* (2006.01)
  *B29K 77/00* (2006.01)
  *B29K 223/00* (2006.01)

(52) U.S. Cl.
  CPC .............. *B32B 27/32* (2013.01); *B32B 27/34* (2013.01); *B29C 45/16* (2013.01); *B29K 2071/02* (2013.01); *B29K 2077/00* (2013.01); *B29K 2223/06* (2013.01); *B29K 2995/0021* (2013.01); *B32B 2250/02* (2013.01); *B32B 2250/24* (2013.01); *B32B 2270/00* (2013.01); *B32B 2307/54* (2013.01); *B32B 2307/546* (2013.01); *B32B 2307/714* (2013.01); *B32B 2605/08* (2013.01); *C08L 2203/30* (2013.01); *C08L 2205/025* (2013.01); *C08L 2205/035* (2013.01)

(58) Field of Classification Search
  CPC . B29C 45/0001; B29C 45/16; B29C 45/0053; B32B 7/10; B32B 27/32; B32B 27/34; B32B 2250/02; B32B 2250/24; B32B 2270/00; B32B 2307/54; B32B 2307/546; B32B 2307/714; B32B 2605/08; B29K 2071/02; B29K 2077/00; B29K 2223/06; B29K 2995/0021; B29K 2077/10
  See application file for complete search history.

(56) References Cited

U.S. PATENT DOCUMENTS

| | | |
|---|---|---|
| 2005/0234180 A1 | 10/2005 | Ono et al. |
| 2008/0038499 A1* | 2/2008 | Ono .................... C08G 69/265 428/36.9 |
| 2009/0098325 A1 | 4/2009 | Uchida et al. |
| 2011/0224346 A1 | 9/2011 | Eibeck et al. |
| 2013/0209784 A1 | 8/2013 | Nakagawa et al. |
| 2014/0342145 A1 | 11/2014 | Oguro et al. |
| 2016/0207292 A1 | 7/2016 | Sato et al. |
| 2021/0087390 A1 | 3/2021 | Joachimi et al. |
| 2021/0347991 A1 | 11/2021 | Yasui et al. |
| 2022/0197495 A1 | 6/2022 | Smolyanskaya et al. |

FOREIGN PATENT DOCUMENTS

| | | |
|---|---|---|
| EP | 1 860 134 B1 | 5/2015 |
| JP | 2001-72880 A | 3/2001 |
| JP | 2002-326326 A | 11/2002 |
| JP | 2002-370551 A | 12/2002 |
| JP | 2004-276600 A | 10/2004 |
| JP | 2005-306950 A | 11/2005 |
| JP | 2006-218665 A | 8/2006 |
| JP | 2006-281507 A | 10/2006 |
| JP | 2010-501653 A | 1/2010 |
| JP | 2012-111941 A | 6/2012 |
| JP | 2016-222903 A | 12/2016 |
| JP | 2019-65231 A | 4/2019 |
| WO | WO 2013/088932 A1 | 6/2013 |
| WO | WO 2015/029571 A1 | 3/2015 |
| WO | WO 2016/068100 A1 | 5/2016 |
| WO | WO 2019/012064 A1 | 1/2019 |
| WO | WO 2019/159861 A1 | 8/2019 |
| WO | WO 2020/049907 A1 | 3/2020 |

OTHER PUBLICATIONS

International Search Report for PCT/JP2021/011384 (PCT/ISA/210) mailed on May 18, 2021.
Chinese Office Action and Search Report for Chinese Application No. 202180022506.0, dated Jul. 3, 2023.
U.S. Appl. No. 17/912,291, filed Sep. 16, 2022.
Extended European Search Report for European Application No. 21770943.5, dated Feb. 21, 2024.
Extended European Search Report for European Application No. 21771497.1, dated Feb. 22, 2024.

* cited by examiner

POLYAMIDE RESIN COMPOSITION

TECHNICAL FIELD

The present invention relates to a polyamide resin composition.

BACKGROUND ART

Polyamide resins are known as resins having excellent fuel permeation resistance (low fuel permeability). Polyamide resin compositions having fuel permeation resistance are demanded in various applications. Patent Literature 1 discloses that a polyamide 6 resin having a concentration of amino terminal groups higher than the concentration of carboxyl terminal groups, and a polyolefin resin modified with an unsaturated carboxylic acid or a derivative thereof are welded to each other to give a fuel part that exhibits excellent fuel permeation resistance and has excellent fuel resistance at the weld.

CITATION LIST

Patent Literature

[Patent Literature 1] Japanese Patent Application Kokai Publication No. 2002-370551

SUMMARY OF INVENTION

Technical Problem

However, compositions containing a polyamide resin such as one disclosed in Patent Literature 1 require further improvements in mechanical characteristics and resistance to calcium chloride used in, for example, snow-melting chemicals.

Furthermore, the present inventors have found that compositions containing a polyamide resin such as one disclosed in Patent Literature 1 still have room for improvement in bonding properties with respect to a polyolefin having a specific amount of acid modification.

It is therefore an object of the present invention to provide a polyamide resin composition for bonding to an acid-modified polyolefin having a specific amount of acid modification that is excellent in mechanical characteristics, bonding properties and calcium chloride resistance.

The present invention pertains to the following [1] to [9].

[1] A polyamide resin composition for bonding to an acid-modified polyolefin, wherein the polyamide resin composition comprises 70 to 99 mass % of an aliphatic polyamide resin (A) having an amino group concentration of 46 to 110 µmol/g, 0 to 18 mass % of an aromatic polyamide resin (B), 0.01 to 0.50 mass % of a polyalkylene glycol alkyl ether (C), 0.01 to 0.50 mass % of a polyolefin wax (D) and 0 to 22.98 mass % of a component (E) other than (A) to (D), and the total amount of (A) to (E) is 100 mass %, and wherein the amount of acid modification of the acid-modified polyolefin is 8 to 100 µmol/g.

[2] The polyamide resin composition of [1], wherein a two-color molded article (2) has an elongation at break of 20% or more, and the two-color molded article (2) is obtained through the following steps 1 to 3:

step 1: injection-molding an acid-modified polyolefin having an amount of acid modification of 8 to 100 µmol/g to obtain a part 1, wherein a cylinder temperature is 200° C. and a mold temperature is 40° C., step 2: heating the part 1 obtained in the step 1 to 100° C., introducing the part 1 into a mold, and subsequently injection-molding the polyamide resin composition to obtain a two-color molded article (1), wherein a cylinder temperature is 290° C. and a mold temperature is 90° C., and step 3: immersing the two-color molded article (1) obtained in the step 2 in an isooctane/toluene/ethanol mixed solution at 65° C. for 1 week to obtain the two-color molded article (2), wherein the volume ratio of isooctane:toluene:ethanol of the mixed solution is 45:45:10.

[3] The polyamide resin composition of [1], wherein a two-color molded article (2') has an elongation at break of 15% or more, and the two-color molded article (2') is obtained through the following steps 1, 2 and 3':

step 1: injection-molding an acid-modified polyolefin having an amount of acid modification of 15 µmol/g to obtain a part 1, wherein a cylinder temperature is 200° C. and a mold temperature is 40° C., step 2: heating the part 1 obtained in the step 1 to 100° C., introducing the part 1 into a mold, and subsequently injection-molding the polyamide resin composition to obtain a two-color molded article (1), wherein a cylinder temperature is 290° C. and a mold temperature is 90° C.;

step 3': immersing the two-color molded article (1) obtained in the step 2 in an isooctane/toluene/ethanol mixed solution at 65° C. for 3 weeks to obtain the two-color molded article (2'), wherein the volume ratio of isooctane:toluene:ethanol of the mixed solution is 45:45:10.

[4] The polyamide resin composition of any of [1] to [3], wherein the aliphatic polyamide resin (A) is an aliphatic homopolyamide resin (A-1).

[5] The polyamide resin composition of any of [1] to [4], wherein the aromatic polyamide resin (B) is an aromatic copolyamide resin.

[6] The polyamide resin composition of any of [1] to [5], wherein the polyalkylene glycol alkyl ether (C) is polyethylene glycol monomethyl ether.

[7] The polyamide resin composition of any of [1] to [6], wherein the number average molecular weight of the polyolefin wax (D) is 1,000 to 5,000.

[8] A molded article comprising the polyamide resin composition of any of [1] to [7] and an acid-modified polyolefin, wherein at least part of the polyamide resin composition and at least part of the acid-modified polyolefin are bonded to each other, and the amount of acid modification of the acid-modified polyolefin is 8 to 100 µmol/g.

[9] A part which is placed in contact with a fuel, wherein the part comprises the molded article of [8].

The present invention also pertains to the following.

[1a] Use of a polyamide resin composition for bonding to an acid-modified polyolefin, wherein the polyamide resin composition is as defined in any of [1] to [7], and the acid-modified polyolefin is as defined in [1].

[2a] A method of using a polyamide resin composition for bonding to an acid-modified polyolefin, wherein the polyamide resin composition is as defined in any of [1] to [7], and the acid-modified polyolefin is as defined in [1].

[3a] Use of a polyamide resin composition as an adhesive for an acid-modified polyolefin, wherein the polyamide resin composition is as defined in any of [1] to [7], and the acid-modified polyolefin is as defined in [1].

[4a] A method of using a polyamide resin composition as an adhesive for an acid-modified polyolefin, wherein the polyamide resin composition is as defined in any of [1] to [7], and the acid-modified polyolefin is as defined in [1].

Advantageous Effects of Invention

The polyamide resin composition for bonding to an acid-modified polyolefin having a specific amount of acid modification provided according to the present invention is excellent in mechanical characteristics, bonding properties and calcium chloride resistance.

DESCRIPTION OF EMBODIMENTS

Figure 1:
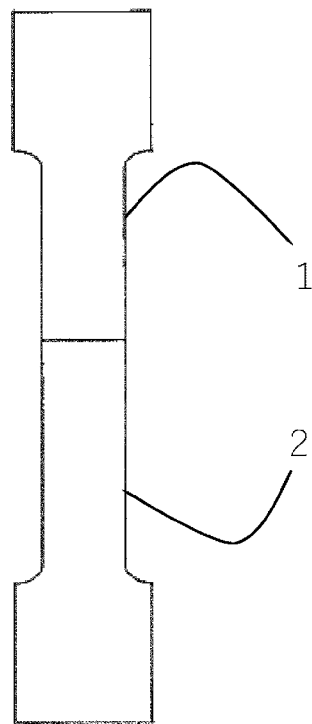
FIG. 1 is a plan view illustrating the shape of a specimen evaluated in a test of bonding properties.

In the present specification, a plurality of substances may correspond to a single component in a composition. In such cases, the content of that component in the composition indicates the total amount of the substances present in the composition unless otherwise specified.

In the present specification, the term "to" used in numerical ranges means that the numerical ranges include the numbers before and after the "to" as the lower limit and the upper limit.

[Polyamide Resin Compositions]

A polyamide resin composition is a polyamide resin composition for bonding to an acid-modified polyolefin, wherein the polyamide resin composition includes 70 to 99 mass % of an aliphatic polyamide resin (A) having an amino group concentration of 46 to 110 μmol/g, 0 to 18 mass % of an aromatic polyamide resin (B), 0.01 to 0.50 mass % of a polyalkylene glycol alkyl ether (C), 0.01 to 0.50 mass % of a polyolefin wax (D) and 0 to 22.98 mass % of a component (E) other than (A) to (D), and the total amount of (A) to (E) is 100 mass %, and wherein the amount of acid modification of the acid-modified polyolefin is 8 to 100 μmol/g.

The polyamide resin composition is excellent not only in mechanical characteristics, bonding properties and calcium chloride resistance, but also in fuel permeation resistance.

Hereinafter, the term "bonding properties" means bonding properties with respect to an "acid-modified polyolefin having an amount of acid modification of 8 to 100 μmol/g" unless otherwise mentioned.

Aliphatic Polyamide Resins (A) Having an Amino Group Concentration of 46 to 110 μMol/g>>

The polyamide resin composition includes an aliphatic polyamide resin (A) having an amino group concentration of 46 to 110 μmol/g (in the present specification, also written simply as the "aliphatic polyamide resin (A)").

The aliphatic polyamide resin (A) is an aliphatic polyamide resin having no aromatic rings and no alicyclic groups. Examples of the aliphatic polyamide resins (A) include aliphatic homopolyamide resins (A-1) and aliphatic copolyamide resins (A-2).

<Aliphatic Homopolyamide Resins (A-1)>

The aliphatic homopolyamide resin (A-1) is an aliphatic polyamide resin composed of a single kind of a monomer component. For example, the monomer component constituting the aliphatic polyamide resin may be a combination of an aliphatic diamine and an aliphatic dicarboxylic acid, or may be a lactam or an aminocarboxylic acid. When the monomer component constituting the aliphatic polyamide resin is a combination of an aliphatic diamine and an aliphatic dicarboxylic acid, the combination of a single aliphatic diamine and a single aliphatic dicarboxylic acid is regarded as a single monomer component.

The number of carbon atoms in the aliphatic diamine is preferably 2 to 20, and particularly preferably 4 to 12. The number of carbon atoms in the aliphatic dicarboxylic acid is preferably 2 to 20, and particularly preferably 6 to 12. The number of carbon atoms in the lactam is preferably 6 to 12. The number of carbon atoms in the aminocarboxylic acid is preferably 6 to 12.

Examples of the aliphatic diamines include ethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecanediamine, tetradecanediamine, pentadecanediamine, hexadecanediamine, heptadecanediamine, octadecanediamine, nonadecanediamine and eicosanediamine.

Examples of the aliphatic dicarboxylic acids include oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid and eicosanedioic acid.

Examples of the combinations of the aliphatic diamine and the aliphatic dicarboxylic acid include a combination of hexamethylenediamine and adipic acid, a combination of hexamethylenediamine and sebacic acid, and a combination of hexamethylenediamine and dodecanedioic acid. The combination is preferably used as an equimolar salt.

Examples of the lactams include ε-caprolactam, enantholactam, undecanelactam, dodecanelactam, α-pyrrolidone and α-piperidone. Examples of the aminocarboxylic acids include 6-aminocaproic acid, 7-aminoheptanoic acid, 9-aminononanoic acid, 11-aminoundecanoic acid and 12-aminododecanoic acid. From the point of view of productivity, the lactam is preferably ε-caprolactam, undecanelactam or dodecanelactam.

Specific examples of the aliphatic homopolyamide resins (A-1) include polycaprolactam (polyamide 6), polyenantholactam (polyamide 7), polyundecanelactam (polyamide 11), polylauryllactam (polyamide 12), polyhexamethyleneadipamide (polyamide 66), polytetramethylenedodecamide (polyamide 412), polypentamethyleneazelamide (polyamide 59), polypentamethylenesebacamide (polyamide 510), polypentamethylenedodecamide (polyamide 512), polyhexamethyleneazelamide (polyamide 69), polyhexamethylenesebacamide (polyamide 610), polyhexamethylenedodecamide (polyamide 612), polynonamethyleneadipamide (polyamide 96), polynonamethyleneazelamide (polyamide 99), polynonamethylenesebacamide (polyamide 910), polynonamethylenedodecamide (polyamide 912), poly decamethyleneadipamide (polyamide 106), poly decamethyleneazelamide (polyamide 109), polydecamethylenedecamide (polyamide 1010), polydecamethylenedodecamide (polyamide 1012), polydodecamethyleneadipamide (polyamide 126), poly dodecamethyleneazelamide (polyamide 129), polydodecamethylenesebacamide (polyamide 1210), polydodecamethylenedodecamide (polyamide 1212) and poly dodecamethyleneoxamide (polyamide 122).

<Aliphatic Copolyamide Resins (A-2)>

The aliphatic copolyamide resin (A-2) is an aliphatic polyamide resin composed of two or more kinds of monomer components and having no aromatic rings and no alicyclic groups. That is, the aliphatic copolyamide resin (A-2) may be an aliphatic copolyamide resin that is a copolymer of two or more kinds of monomers selected from the group consisting of combinations of an aliphatic diamine and an aliphatic dicarboxylic acid, lactams and aminocarboxylic acids.

Specific examples of the aliphatic copolyamide resins (A-2) include caprolactam/hexamethylenediaminoadipic acid copolymer (polyamide 6/66), caprolactam/hexamethylenediaminoazelaic acid copolymer (polyamide 6/69), caprolactam/hexamethylenediaminosebacic acid copolymer (polyamide 6/610), caprolactam/hexamethylenediaminoundecanoic acid copolymer (polyamide 6/611), caprolactam/hexamethylenediaminododecanoic acid copolymer (polyamide 6/612), caprolactam/aminoundecanoic acid copolymer (polyamide 6/11), caprolactam/lauryllactam copolymer (polyamide 6/12), caprolactam/hexamethylenediaminoadipic acid/lauryllactam copolymer (polyamide 6/66/12), caprolactam/hexamethylenediaminoadipic acid/hexamethylenediaminosebacic acid copolymer (polyamide 6/66/610), caprolactam/hexamethylenediaminoadipic acid/hexamethylenediaminododecanedicarboxylic acid copolymer (polyamide 6/66/612) and hexamethylenediaminoadipic acid/caprolactam copolymer (polyamide 66/6).

PREFERRED EMBODIMENT

From the point of view of productivity, the aliphatic polyamide resin (A) is preferably the aliphatic homopolyamide resin (A-1), more preferably one or more selected from the group consisting of polyamide 6, polyamide 66, polyamide 610, polyamide 612, polyamide 11 and polyamide 12, and particularly preferably polyamide 6 and/or polyamide 66.

<Characteristics>
(Amino Group Concentration)

An amino group concentration of the aliphatic polyamide resin (A) is 46 to 110 μmol/g. If the amino group concentration is less than 46 μmol/g, bonding properties are poor. It is difficult to produce the polyamide resin having an amino group concentration of more than 110 μmol/g while maintaining the molecular weight, and the molecular weight is lowered to cause deterioration in mechanical properties of molded articles. The amino group concentration of the aliphatic polyamide resin (A) is preferably 50 to 110 μmol/g, more preferably 60 to 100 μmol/g, and particularly preferably 80 to 99 μmol/g. The amino group concentration is a value determined by neutralization titration of the resin dissolved in a mixed solvent of phenol and methanol. The amino group concentration may be controlled by adding an aliphatic mono- or diamine and/or an aliphatic mono- or dicarboxylic acid in the production of the aliphatic polyamide resin (A).

(Relative Viscosity)

The relative viscosity of the aliphatic polyamide resin (A) is not particularly limited. The relative viscosity measured with respect to a 1 mass % solution of the aliphatic polyamide resin (A) in 96 mass % sulfuric acid at 25° C. in accordance with JIS K 6920 is preferably 1.8 to 5.0, and particularly preferably 1.8 to 4.5. The relative viscosity is preferably measured as described above. When, however, the aliphatic polyamide resin (A) is a mixture of aliphatic polyamide resins, and the relative viscosities and the mixing ratio of the resins are known, the relative viscosity of the whole of the aliphatic polyamide resins (A) may be the average value determined by multiplying the respective relative viscosities by the mixing ratio and combining the products.

A production equipment for the aliphatic polyamide resin (A) includes a known polyamide production equipment such as a batch reaction vessel, a single-tank or multi-tank continuous reactor, a tubular continuous reactor, or a kneading reaction extruder such as a single-screw kneading extruder or a twin-screw kneading extruder. The polymerization method may be a known method such as melt polymerization, solution polymerization or solid-phase polymerization. The polymerization may be performed while repeating pressure control to atmospheric pressure, reduced pressure and increased pressure. These polymerization methods may be performed singly or may be appropriately combined.

The method for producing the aliphatic polyamide resin (A) is not particularly limited as long as the aliphatic polyamide resin (A) that is obtained has an amino group concentration of 46 to 110 μmol/g. Specifically, for example, the method for producing the aliphatic polyamide resin (A) includes a step of adding an aliphatic diamine compound during or after the polymerization of an aliphatic polyamide resin, and/or when an aliphatic polyamide resin is kneaded and extruded. Alternatively, the aliphatic polyamide resin (A) may be produced by a method in which the raw materials are fed and polymerized in such a manner that the aliphatic diamine compound is added in an excessively large amount, a method in which the raw material monomer components are fed and polymerized in such a manner that an aliphatic diamine compound other than the raw material monomer component is added together with the raw materials, or a method in which an aliphatic polyamide resin having a predetermined molecular weight is produced and an aliphatic diamine compound is added in such an amount that the target amino group concentration will be obtained immediately before the aliphatic polyamide resin is taken off from the polymerization tank. Still alternatively, the aliphatic polyamide resin (A) may be produced by a method in which an aliphatic polyamide resin produced by polymerization is melt-kneaded with a diamine compound so that the target amino group concentration will be obtained. The conditions for the production of the aliphatic polyamide resin (A) other than those described above are found in, for example, Japanese Patent Application Kokai Publication No. 2002-370551.

The aliphatic polyamide resins (A) may be one kind or a combination of two or more kinds.

<<Aromatic Polyamide Resins (B)>>

The aromatic polyamide resin (B) is a polyamide resin containing an aromatic ring. That is, the aromatic polyamide resin (B) may be an aromatic copolyamide resin (B-1) or an aromatic homopolyamide resin (B-2).

<Aromatic Copolyamide Resins (B-1)>

The aromatic copolyamide resin (B-1) is an aromatic polyamide resin composed of two or more kinds of monomer components. Examples of the aromatic copolyamide resins (B-1) include aromatic polyamide resins that are copolymers of monomers selected from combinations of an aliphatic and/or alicyclic diamine and an aromatic dicarboxylic acid, combinations of an aromatic diamine and an aliphatic and/or alicyclic dicarboxylic acid, and combinations of an aromatic diamine and an aromatic dicarboxylic acid. When the monomer component constituting the aromatic polyamide resin is a combination of a diamine and a dicarboxylic acid, the combination of a single diamine and a single dicarboxylic acid is regarded as a single monomer component. Examples of the aliphatic diamines and the aliphatic dicarboxylic acids include those described hereinabove.

Examples of the aromatic dicarboxylic acids include such aromatic dicarboxylic acids as terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, dibenzoic acid, 4,4'-oxydibenzoic acid, diphenylmethane-4,4'-dicarboxylic acid, diphenylsulfone-4,4'-dicarboxylic acid and 4,4'-biphenyldicarboxylic acid. Examples of the alicyclic dicarboxylic acids include 1,3-cyclopentanedicarboxylic acid and 1,4-cyclohexanedicarboxylic acid.

Examples of the aromatic diamines include such aromatic diamines as p-phenylenediamine, m-phenylenediamine, p-xylenediamine, m-xylenediamine, 4,4'-diaminodiphenylmethane, 4,4'-diaminodiphenylsulfone and 4,4'-diaminodiphenyl ether. Examples of the alicyclic diamines include cyclohexanediamine, methylcyclohexanediamine and isophoronediamine.

Specific examples of the aromatic copolyamide resins (B-1) include poly(tetramethylene terephthalamide/hexamethylene terephthalamide) copolymer (polyamide 4T/6T), poly(tetramethylene terephthalamide/tetramethylene adipamide) copolymer (polyamide 4T/46), poly(hexamethylene terephthalamide/hexamethylene isophthalamide) copolymer (polyamide 6T/6I), poly(hexamethylene terephthalamide/2-methylpentamethylene terephthalamide) copolymer (polyamide 6T/M5T), poly(hexamethylene terephthalamide/caproamide) copolymer (polyamide 6T/6), poly(hexamethylene terephthalamide/hexamethylene adipamide) copolymer (polyamide 6T/66), poly(hexamethylene terephthalamide/hexamethylene sebacamide) copolymer (polyamide 6T/610), poly(hexamethylene terephthalamide/hexamethylene dodecamide) copolymer (polyamide 6T/612), poly(hexamethylene terephthalamide/hexamethylene isophthalamide/hexamethylene adipamide) copolymer (polyamide 6T/6I/66), poly(hexamethylene terephthalamide/hexamethylene isophthalamide/hexamethylene sebacamide) copolymer (polyamide 6T/6I/610), and poly(hexamethylene terephthalamide/hexamethylene isophthalamide/hexamethylene dodecamide) copolymer (polyamide 6T/6I/612).

Specific examples of the aromatic copolyamide resins (B-1) further include poly(nonamethylene terephthalamide/2-methyloctamethylene terephthalamide) copolymer (polyamide 9T/M8T), poly(nonamethylene terephthalamide/2-methyloctamethylene terephthalamide/undecaneamide) copolymer (polyamide 9T/M8T/11), poly(nonamethylene terephthalamide/2-methyloctamethylene terephthalamide/dodecaneamide) copolymer (polyamide 9T/M8T/12), poly(nonamethylene terephthalamide/2-methyloctamethylene terephthalamide/nonamethylene isophthalamide/2-methyloctamethylene isophthalamide) copolymer (polyamide 9T/M8T/9I/M8I), poly(nonamethylene naphthalamide/2-methyloctamethylene naphthalamide) copolymer (polyamide 9N/M8N), poly(nonamethylene naphthalamide/2-methyloctamethylene naphthalamide/undecaneamide) copolymer (polyamide 9N/M8N/11), poly(nonamethylene naphthalamide/2-methyloctamethylene naphthalamide/dodecaneamide) copolymer (polyamide 9N/M8N/12), poly(decamethylene terephthalamide/undecaneamide) copolymer (polyamide 10T/11), poly(decamethylene terephthalamide/dodecaneamide) copolymer (polyamide 10T/12), poly(decamethylene terephthalamide/decamethylene sebacamide) copolymer (polyamide 10T/1010), poly(decamethylene terephthalamide/decamethylene dodecamide) copolymer (polyamide 10T/1012), poly(decamethylene terephthalamide/decamethylene isophthalamide/undecaneamide) copolymer (polyamide 10T/10I/11), poly(decamethylene terephthalamide/decamethylene isophthalamide/dodecaneamide) copolymer (polyamide 10T/10I/12), poly(decamethylene terephthalamide/decamethylene isophthalamide/decamethylene sebacamide) copolymer (polyamide 10T/10I/1010), poly(decamethylene terephthalamide/decamethylene isophthalamide/decamethylene dodecamide) copolymer (polyamide 10T/10I/1012), poly(decamethylene naphthalamide/undecaneamide) copolymer (polyamide 10N/11), poly(decamethylene naphthalamide/dodecaneamide) copolymer (polyamide 10N/12), poly(decamethylene naphthalamide/decamethylene sebacamide) copolymer (polyamide 10N/1010), poly(decamethylene naphthalamide/decamethylene dodecamide) copolymer (polyamide 10N/1012), poly(decamethylene terephthalamide/decamethylene naphthalamide/undecaneamide) copolymer (polyamide 10T/10N/11), poly(decamethylene terephthalamide/decamethylene naphthalamide/dodecaneamide) copolymer (polyamide 10T/10N/12), poly(decamethylene terephthalamide/decamethylene naphthalamide/decamethylene sebacamide) copolymer (polyamide 10T/10N/1010), and poly(decamethylene terephthalamide/decamethylene naphthalamide/decamethylene dodecamide) copolymer (polyamide 10T/10N/1012).

Specific examples of the aromatic copolyamide resins (B-1) further include poly(dodecamethylene terephthalamide/undecaneamide) copolymer (polyamide 12T/11), poly(dodecamethylene terephthalamide/dodecaneamide) copolymer (polyamide 12T/12), poly(dodecamethylene terephthalamide/dodecamethylene sebacamide) copolymer (polyamide 12T/1210), poly(dodecamethylene terephthalamide/dodecamethylene dodecamide) copolymer (polyamide 12T/1212), poly(dodecamethylene terephthalamide/dodecamethylene isophthalamide/undecaneamide) copolymer (polyamide 12T/12I/11), poly(dodecamethylene terephthalamide/dodecamethylene isophthalamide/dodecaneamide) copolymer (polyamide 12T/12I/12), poly(dodecamethylene terephthalamide/dodecamethylene isophthalamide/dodecamethylene sebacamide) copolymer (polyamide 12T/12I/1210), poly(dodecamethylene terephthalamide/dodecamethylene isophthalamide/dodecamethylene dodecamide) copolymer (polyamide 12T/12I/1212), poly(dodecamethylene naphthalamide/undecaneamide) copolymer (polyamide 12N/11), poly(dodecamethylene naphthalamide/dodecaneamide) copolymer (polyamide 12N/12), poly(dodecamethylene naphthalamide/dodecamethylene sebacamide) copolymer (polyamide 12N/1210), poly(dodecamethylene naphthalamide/dodecamethylene dodecamide) copolymer (polyamide 12N/1212), poly(dodecamethylene terephthalamide/dodecamethylene naphthalamide/undecaneamide) copolymer (polyamide 12T/12N/11), poly(dodecamethylene terephthalamide/dodecamethylene naphthalamide/dodecaneamide) copolymer (polyamide 12T/12N/12), poly(dodecamethylene terephthalamide/dodecamethylene naphthalamide/dodecamethylene sebacamide) copolymer (polyamide 12T/12N/1210), and poly(dodecamethylene terephthalamide/dodecamethylene naphthalamide/dodecamethylene dodecamide) copolymer (polyamide 12T/12N/1212).

<Aromatic Homopolyamide Resins (B-2)>

The aromatic homopolyamide resin (B-2) is an aliphatic polyamide resin composed of a single kind of monomer component. That is, the aromatic homopolyamide resin (B-2) may be a combination of an aliphatic and/or alicyclic diamine and an aromatic dicarboxylic acid, a combination of an aromatic diamine and an aliphatic and/or alicyclic dicarboxylic acid, or a combination of an aromatic diamine and an aromatic dicarboxylic acid. Examples of the aliphatic diamines, the alicyclic diamines, the aromatic diamines, the aliphatic dicarboxylic acids, the alicyclic dicarboxylic acids and the aromatic dicarboxylic acids include those described hereinabove.

Specific examples of the aromatic homopolyamide resins (B-2) include polynonamethylene terephthalamide (polyamide 9T), polynonamethylene naphthalamide (polyamide 9N), polydecamethylene terephthalamide (polyamide 10T), poly decamethylene naphthalamide (polyamide 10N), polydodecamethylene terephthalamide (polyamide 12T), poly dodecamethylene naphthalamide (polyamide 12N), poly-m-xylylene succinamide (polyamide MXD4), poly-m-xylylene glutamide (polyamide MXD5), poly-m-xylylene adipamide (polyamide MXD6), poly-m-xylylene suberamide (polyamide MXD8), poly-m-xylylene azelamide (polyamide MXD9), poly-m-xylylene sebacamide (polyamide MXD10), poly-m-xylylene dodecamide (polyamide MXD12), poly-p-xylylene succinamide (polyamide PXD4), poly-p-xylylene glutamide (polyamide PXD5), poly-p-xylylene adipamide (polyamide PXD6), poly-p-xylylene suberamide (polyamide PXD8), poly-p-xylylene azelamide (polyamide PXD9), poly-p-xylylene sebacamide (polyamide PXD10) and poly-p-xylylene dodecamide (polyamide PXD12).

PREFERRED EMBODIMENTS

The aromatic polyamide resin (B) is preferably an aromatic copolyamide resin (B-1) composed of an aliphatic diamine, and 40 to 95 mol % of units derived from terephthalic acid and 5 to 60 mol % of units derived from isophthalic acid, or an aromatic homopolyamide resin (B-2) composed of an aliphatic dicarboxylic acid and m-or p-xylenediamine, and is more preferably an aromatic copolyamide resin (B-1) including 60 to 99 wt % of units derived from monomer components including an aliphatic diamine, isophthalic acid and terephthalic acid, and 1 to 40 wt % of units derived from an aliphatic polyamide component, or an aromatic homopolyamide resin (B-2) composed of an aliphatic dicarboxylic acid and m-xylenediamine. Here, the monomer components including an aliphatic diamine, isophthalic acid and terephthalic acid are preferably an equimolar salt of hexamethylenediamine and terephthalic acid and an equimolar salt of hexamethylenediamine and isophthalic acid. From the point of view of productivity, the aromatic polyamide resin (B) is more preferably one or more selected from the group consisting of polyamide 6T/6I, polyamide MXD6 and polyamide PXD6, and is particularly preferably polyamide 6T/6I.

<Characteristics>
<<Amino group concentration>>

The amino group concentration of the aromatic polyamide resin (B) is not particularly limited, but is preferably 20 to 110 μmol/g from the point of view of productivity, more preferably 30 to 100 μmol/g, and particularly preferably 31 to 49 μmol/g. The amino group concentration may be controlled by adding a mono- or diamine and/or a mono- or dicarboxylic acid during the production of the aromatic polyamide resin (B).

<<Relative viscosity>>

The relative viscosity of the aromatic polyamide resin (B) is not particularly limited. The relative viscosity measured with respect to a 1 wt % solution of the aromatic polyamide resin (B) in 96% sulfuric acid at 25° C. in accordance with JIS K 6920 is preferably 1.8 to 5.0, and particularly preferably 1.8 to 4.5. When two or more kinds of the aromatic polyamide resins (B) are used, the relative viscosity may be measured as described with respect to the aliphatic polyamide resins (A).

A production equipment and polymerization method for the aromatic polyamide resin (B) include those similar to the production equipment and the polymerization method described hereinabove with respect to the aliphatic polyamide resin (A).

The aromatic polyamide resins (B) may be one kind or a combination of two or more kinds.

<<Polyalkylene Glycol Alkyl Ethers (C)>>

The polyalkylene glycol alkyl ether (C) is a monoalkyl ether or a dialkyl ether of a polyalkylene glycol having alkylene chains.

The number of carbon atoms of the alkylene chain of the polyalkylene glycol is preferably 1 to 6, and particularly preferably 2 to 4. The alkylene chains of the polyalkylene glycol may be linear or branched, and may be a single kind or a combination of two or more kinds of alkylene chains. Specific examples of the polyalkylene glycols include polyethylene glycol, polypropylene glycol and polytetramethylene glycol. The number of carbon atoms of the alkyl group in the alkyl ether is preferably 1 to 6, and particularly preferably 1 to 4.

Thus, the polyalkylene glycol alkyl ether (C) is preferably a C1-C6 monoalkyl ether of a polyalkylene glycol having C1-C6 alkylene chains, and is particularly preferably a monomethyl ether of polyethylene glycol.

From the point of view of molding processability, the number average molecular weight of the polyalkylene glycol alkyl ether (C) is preferably 500 to 10,000, and particularly preferably 1,000 to 5,000. Here, the number average molecular weight of the polyalkylene glycol alkyl ether (C) can be measured by gel permeation chromatography (GPC).

Examples of the commercial products of the polyalkylene glycol alkyl ethers (C) include M-PEG CP400, CP500, CP2500 and CP5000 manufactured by DKS Co. Ltd.; and UNIOX M-400, M-550, M-1000, M-2000 and M-4000 manufactured by NOF CORPORATION.

The polyalkylene glycol alkyl ethers (C) may be single kind or a combination of two or more kinds.

<<Polyolefin Waxes (D)>>

Examples of the polyolefin waxes (D) include polyethylene waxes, polypropylene waxes, polyethylene copolymer waxes, polyethylene oxide waxes, acid-modified polyethylene waxes and acid-modified polypropylene waxes. Here, examples of the polyethylene copolymers include copolymers of polyethylene with α-olefins other than ethylene.

The polyolefin wax (D) is preferably a polyethylene wax, or a modified polyethylene wax obtained by introducing a polar group into a polyethylene wax through oxidative modification or acid modification.

From the point of view of attaining the enhanced dispersibility in the polyamide resins, the polyolefin wax (D) is preferably a polyolefin wax having a polar group introduced by acid modification. The acid modification will be described later with respect to the acid-modified polyolefins.

The number average molecular weight of the polyolefin wax (D) is preferably 1,000 to 5,000, and particularly preferably 1,500 to 4,000. Here, the number average molecular weight of the polyolefin wax can be measured by gel permeation chromatography (GPC).

The melting point of the polyolefin wax (D) is not particularly limited, but is preferably 60 to 145° C.

Examples of the commercial products of the polyolefin waxes (D) include Hi-WAX 200P, 320P, 400P, 420P, 405MP, 320MP, 4051E, 2203A and NL800 manufactured by Mitsui Chemicals, Inc.

The polyolefin waxes (D) may be single kind or a combination of two or more kinds.

<<Components (E) Other than (A) to (D)>>

The polyamide resin composition may include a component (E) other than (A) to (D) as long as the advantageous effects of the present invention are not impaired. Examples of the components (E) include polyamide resins other than the aliphatic polyamide resins (A) and the aromatic polyamide resins (B); diamines; and functionality-imparting agents such as plasticizers, heat resistant materials, foaming agents, weathering agents, nucleating agents, antioxidants, crystallization accelerators, mold release agents, lubricants, antistatic agents, flame retardants, flame retardant aids, pigments and dyes.

Examples of the polyamide resins other than the aliphatic polyamide resins (A) and the aromatic polyamide resins (B) include aliphatic polyamide resins having an amino group concentration of less than 46 µmol/g, and aliphatic polyamide resins having an amino group concentration of more than 110 µmol/g.

The diamines are components that can increase the amino group concentration in the polyamide resins. When the polyamide resin composition contains the diamine as the component (E), bonding properties of the polyamide resin composition may be enhanced. Examples of the diamines include those components described hereinabove. Aliphatic diamines are preferable.

The pigment may be added to control the color of the polyamide resin composition. Examples of the pigments include inorganic pigments and organic pigments, such as titanium oxide, zinc oxide, carbon black, molybdenum red, Prussian blue, cobalt blue, clay, kaolin, barium sulfate, barium carbonate, calcium carbonate, talc, silica, alumina white, azo pigments, phthalocyanine pigments, quinacridone pigments, isoindoline pigments, threne pigments and perylene pigments.

Examples of the functionality-imparting agents other than the pigment include those components described in, for example, Japanese Patent Application Kokai Publication No. 2002-370551.

Each of components (E) may be one kind or a combination of two or more kinds. For example, the component (E) may be a combination of one or more pigments, and one or more organic antioxidants.

Preferably, the polyamide resin composition is free from polyamide resins other than the aliphatic polyamide resins (A) and the aromatic polyamide resins (B).

That is, the polyamide resins in the polyamide resin composition preferably consist of the aliphatic polyamide resin(s) (A) and the aromatic polyamide resin(s) (B).

<<Contents>>

The respective contents of the components with respect to the mass of the whole of the polyamide resin composition are as described below. In the polyamide resin composition, the total amount of (A) to (E) is 100 mass %.

The content of the aliphatic polyamide resin (A) is 70 to 99 mass %. From the points of view of mechanical properties and molding processability, the content of the aliphatic polyamide resin (A) with respect to the mass of the whole of the polyamide resin composition is preferably 70.01 to 98.99 mass %, and more preferably 85.01 to 98.99 mass %. From the points of view of mechanical properties and molding processability, the content of the aliphatic homopolyamide resin (A-1) with respect to the mass of the whole of the aliphatic polyamide resin (A) is preferably 60 to 100 mass %, more preferably 90 to 100 mass %, and particularly preferably 95 to 100 mass %.

The content of the aromatic polyamide resin (B) is 0 to 18 mass %. From the points of view of mechanical properties and molding processability, the content of the aromatic polyamide resin (B) with respect to the mass of the whole of the polyamide resin composition is preferably 0 to 15 mass %, and particularly preferably 0 to 12 mass %.

The content of the polyalkylene glycol alkyl ether (C) is 0.01 to 0.50 mass %. From the points of view of mechanical properties and molding processability, the content of the polyalkylene glycol alkyl ether (C) is preferably 0.03 to 0.45 mass %, more preferably 0.05 to 0.40 mass %, and particularly preferably 0.10 to 0.30 mass %.

The content of the polyolefin wax (D) is 0.01 to 0.50 mass %. From the points of view of mechanical properties and molding processability, the content of polyolefin wax (D) is preferably 0.02 to 0.45 mass %, more preferably 0.03 to 0.40 mass %, and particularly preferably 0.05 to 0.15 mass %.

The content of the component (E) other than (A) to (D) is 0 to 22.98 mass %. From the points of view of mechanical properties and molding processability, the content of the component (E) other than (A) to (D) is preferably 0 to 20.00 mass %, more preferably 0 to 15.00 mass %, and particularly preferably 0 to 5.00 mass %.

Preferred Embodiments

The polyamide resin composition is preferably such that a two-color molded article (2) has an elongation at break of 20% or more, wherein the two-color molded article (2) is obtained through the following steps 1 to 3:

step 1: injection-molding an acid-modified polyolefin having an amount of acid modification of 15 µmol/g to obtain a part 1, wherein a cylinder temperature is 200° C. and a mold temperature is 40° C., step 2: heating the part 1 obtained in the step 1 to 100° C., introducing the part 1 into a mold, and subsequently injection-molding the polyamide resin composition to obtain a two-color molded article (1), wherein a cylinder temperature is 290° C. and a mold temperature is 90° C., and step 3: immersing the two-color molded article (1) obtained in the step 2 in an isooctane/toluene/ethanol mixed solution at 65° C. for 1 week to obtain the two-color molded article (2), wherein the volume ratio of isooctane:toluene: ethanol of the mixed solution is 45:45:10.

Furthermore, the polyamide resin composition is preferably such that a two-color molded article (2') has an elongation at break of 15% or more, particularly preferably 20% or more, wherein the two-color molded article (2') is obtained through the above steps 1 and 2 and the following step 3':

Step 3': immersing the two-color molded article (1) obtained in the step 2 in an isooctane/toluene/ethanol mixed solution at 65° C. for 3 weeks to obtain the two-color molded article (2'), wherein the volume ratio of isooctane: toluene:ethanol of the mixed solution is 45:45:10.

The two-color molded articles (1), (2) and (2') may be produced by the method described in Japanese Patent Application Kokai Publication No. 2002-370551 while adopting the conditions described later with respect to the use applications of the polyamide resin compositions and in Examples.

<<Methods for Producing Polyamide Resin Compositions>>

A method for producing the polyamide resin composition is not particularly limited. For example, the following methods may be adopted. The aliphatic polyamide resin (A), the aromatic polyamide resin (B), the polyalkylene glycol alkyl ether (C), the polyolefin wax (D), and the component (E) other than (A) to (D) may be mixed together using a commonly known melt kneading equipment such as a single-screw or twin-screw extruder, a Banbury mixer, a kneader or a mixing roll. Specifically, for example, all the ingredients may be mixed together and then melt kneaded using a twin-screw extruder. Alternatively, some of the ingredients may be mixed together and then melt kneaded, and further the rest of the ingredients may be added and melt kneaded. Still alternatively, some of the ingredients may be mixed together and then melt kneaded while mixing the rest of the ingredients using a side feeder. The production methods are not limited to those described above.

<<Acid-Modified Polyolefins Having an Amount of Acid Modification of 8 to 100 µMol/g>>

The acid-modified polyolefin having an amount of acid modification of 8 to 100 µmol/g (in the present specification, also written simply as the "acid-modified polyolefin") has the predetermined amount of acid modification in order for the polyamide resin composition to exhibit bonding properties. The molecule of this polyolefin contains functional groups having affinity for the polyamide resin (A) in such an amount that the polyamide resin composition exhibits bonding properties.

The amount of acid modification of the acid-modified polyolefin is 8 to 100 µmol/g, preferably 9 to 100 µmol/g, more preferably 10 to 100 µmol/g, and particularly preferably 12 to 40 µmol/g. If the amount of acid modification of the acid-modified polyolefin is less than 8 µmol/g, good bonding properties are not obtained. If the amount of acid modification of the acid-modified polyolefin is more than 100 µmol/g, the acid-modified polyolefin and the polyamide resin react excessively with each other at the bonding interface to give rise to a risk that mechanical properties inherent to the polyolefin may be deteriorated. The amount of acid modification in the acid-modified polyolefin may be measured by titration. Specifically, the amount of acid modification in the acid-modified polyolefin may be measured by the method described in Examples.

Examples of the polyolefins in the acid-modified polyolefins include (ethylene and/or propylene)/α-olefin copolymers, and (ethylene and/or propylene)/(α,β-unsaturated carboxylic acid and/or α,β-unsaturated carboxylic acid ester) copolymers, with ethylene/α-olefin copolymers being preferable.

The (ethylene and/or propylene)/α-olefin copolymer is a polymer obtained by copolymerizing ethylene and/or propylene with a C3 or higher α-olefin.

Examples of the C3 or higher α-olefins include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-I-pentene, 4-methyl-1-pentene, 4-methyl-1-hexene, 4,4-dimethyl-1-hexene, 4,4-dimethyl-1-pentene, 4-ethyl-1-hexene, 3-ethyl-I-hexene, 9-methyl-1-decene, 11-methyl-1-dodecene and 12-ethyl-1-tetradecene.

The copolymer may include an additional comonomer, for example, a polyene such as a nonconjugated diene. Examples of the nonconjugated dienes include 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, cyclooctadiene, 5-vinylnorbornene, 5-ethylidene-2-norbornene, 5-methylene-2-norbornene, 5-isopropylidene-2-norbornene, 6-chloromethyl-5-isopropylidene-2-norbornene, 2,3-diisopropylidene-5-norbornene, 2-ethylidene-3-isopropylidene-5-norbornene and 2-propenyl-2,5-norbornadiene.

The (ethylene and/or propylene)/(α,β-unsaturated carboxylic acid and/or α,β-unsaturated carboxylic acid ester) copolymer is a polymer obtained by copolymerizing ethylene and/or propylene with an α,β-unsaturated carboxylic acid monomer and/or an α,β-unsaturated carboxylic acid ester monomer. Examples of the α,β-unsaturated carboxylic acid monomers include acrylic acid and methacrylic acid. Examples of the α,β-unsaturated carboxylic acid ester monomers include methyl esters, ethyl esters, propyl esters, butyl esters, pentyl esters, hexyl esters, heptyl esters, octyl esters, nonyl esters and decyl esters of α,β-unsaturated carboxylic acids.

Examples of the compounds for acid-modifying the polyolefins include carboxylic acids and derivatives thereof Examples of the carboxylic acids and the derivatives thereof include acrylic acid, methacrylic acid, maleic acid, fumaric acid, itaconic acid, crotonic acid, mesaconic acid, citraconic acid, glutaconic acid, cis-4-cyclohexene-1,2-dicarboxylic acid, endo-bicyclo-[2.2.1]-5-heptene-2,3-dicarboxylic acid, metal salts of these carboxylic acids, monomethyl maleate, monomethyl itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, maleic anhydride, itaconic anhydride, citraconic anhydride, endo-bicyclo-[2.2.1]-5-heptene-2,3-dicarboxylic anhydride, maleimide, N-ethylmaleimide, N-butylmaleimide, N-phenylmaleimide, acrylamide, methacrylamide, glycidyl acrylate, glycidyl methacrylate, glycidyl ethacrylate, glycidyl itaconate and glycidyl citraconate.

The acid-modified polyolefins are preferably (ethylene and/or propylene)/α-olefin copolymers acid-modified with unsaturated carboxylic acids or acid anhydrides thereof, and (ethylene and/or propylene)/(α,β-unsaturated carboxylic acid and/or α,β-unsaturated carboxylic acid ester) copolymers acid-modified with unsaturated carboxylic acids or acid anhydrides thereof.

[Use Applications of Polyamide Resin Compositions]

The polyamide resin composition may be used in the production of molded articles by known methods without limitation. A molded article using the polyamide resin composition includes the polyamide resin composition and the acid-modified polyolefin, wherein at least part of the polyamide resin composition and at least part of the acid-modified polyolefin are bonded to each other. That is, the present invention also pertains to the use of the polyamide resin composition for bonding to an acid-modified polyolefin. The present invention also pertains to a method of using the polyamide resin composition for bonding to an acid-modified polyolefin. The present invention also pertains to the use of the polyamide resin composition as an adhesive for the acid-modified polyolefin. The present invention also pertains to a method of using the polyamide resin composition as an adhesive for the acid-modified polyolefin.

A molded article using the polyamide resin composition may be produced by a method including a step of bonding the polyamide resin composition and the acid-modified polyolefin to each other. Here, the method of bonding the polyamide resin composition and the acid-modified polyolefin may be any method without limitation.

The molded article using the polyamide resin composition is preferably produced by a method including a step of welding the polyamide resin composition and the acid-modified polyolefin to each other. For example, the method for welding the polyamide resin composition and the acid-modified polyolefin includes a step of molding the acid-modified polyolefin, and a step of injection molding the polyamide resin composition so as to weld both molded articles together. Thus, the present invention also pertains to a method for producing a molded article including a step of bonding the polyamide resin composition and the acid-modified polyolefin to each other. Here, the method for producing a molded article preferably includes a step of welding the polyamide resin composition and the acid-modified polyolefin to each other.

Examples of the techniques for welding a molded article of the polyamide resin composition and a molded article of the acid-modified polyolefin to each other include vibration welding processes, injection welding processes, ultrasonic welding processes, spin welding processes, hot plate welding processes, hot wire welding processes, laser welding processes and high-frequency induction heating welding processes. The welding process may be selected appropriately in accordance with the desired shape and/or the purpose of use of the molded article. Examples of the injection welding processes include die slide injection (DSI), die rotary injection (DRI) and two-color molding.

The molding resin temperature in the injection welding process is preferably 250° C. to 320° C., and particularly preferably 270° C. to 300° C. The mold temperature in the injection welding process is preferably 30° C. to 120° C., and particularly preferably 50° C. to 100° C.

The acid-modified polyolefin may be molded by any method under any conditions without limitation. The molding resin temperature of the acid-modified polyolefin is preferably 190° C. to 250° C., and particularly preferably 180° C. to 220° C. The mold temperature for molding of the acid-modified polyolefin is preferably 10° C. to 90° C., and particularly preferably 30° C. to 60° C.

Specifically, the method for producing a molded article using the polyamide resin composition is preferably a method for producing a two-color molded article that includes the following steps 1-a and 2-a:

Step 1-a: injection molding the acid-modified polyolefin having an amount of acid modification of 8 to 100 μmol/g to obtain a part 1, wherein a cylinder temperature is 180 to 220° C. and a mold temperature is 30 to 60° C., and Step 2-a: heating the part 1 obtained in the step 1-a to 90 to 110° C. (preferably 100° C.), placing the part 1 into a mold, and subsequently injection molding the polyamide resin composition to obtain a two-color molded article, wherein a molding resin temperature is 270 to 300° C. and a mold temperature is 50 to 100° C.

The molded articles obtained using the polyamide resin composition may have any shapes such as, for example, film shapes, sheet shapes and hollow shapes (including tube shapes, hose shapes and bottle shapes). The shape may be selected appropriately in accordance with the purpose of the molded article.

The molded articles obtained using the polyamide resin composition may be used as such or as parts including the molded article in various applications such as automobile parts, railway parts, mechanical parts, industrial materials, industrial parts, electric parts, electronic parts, medical parts, food packaging parts, household goods, office goods, building material-related parts and furniture parts. The parts used in these applications may appropriately include known components other than the molded articles in accordance with the applications.

By virtue of excellent fuel resistance of the polyamide resin composition, the molded articles obtained using the polyamide resin composition are preferably used as parts that include the molded article which is placed in contact with a fuel. Here, the fuel is not particularly limited, but is preferably an automobile fuel. That is, the parts which is placed in contact with a fuel are preferably automobile parts.

Specific examples of the automobile parts include fuel parts (fuel tanks such as gasoline tanks and oil tanks; fuel delivery parts such as fuel delivery pipes, fuel rails, fuel tubes and fuel hoses; and parts attached to parts that are placed or are to be placed in contact with a fuel, such as valves attached to fuel tanks, fuel hose joints, canister connection nozzles and separators); intake system parts and exhaust system parts (such as air ducts, intake manifolds, air cleaners, air cleaner boxes, resonators, throttle bodies, pneumatic hoses and pneumatic tubes); automobile exterior panel/exterior structure members (such as air spoilers, fenders, bumpers and suspension boots); and other automobile parts (such as hose joints, hydraulic tubes, hydraulic hoses and seat covers).

For example, the parts that are placed or are to be placed in contact with a fuel are preferably valves attached to fuel tanks, fuel hose joints, canister connection nozzles and separators.

EXAMPLES

Hereinbelow, the present invention will be described in greater detail based on Examples and Comparative Examples. However, it should be construed that the scope of the present invention is not limited to those Examples. The contents of components described in the table are all mass %. The components used in Examples and Comparative Examples, and the methods used to evaluate properties of molded articles are described below.

[Components used]
1. Aliphatic polyamide resin (A)
(1) PA6 (1): Polyamide 6 (manufactured by Ube Industries, Ltd., amino group concentration=91 μmol/g)
2. Aromatic polyamide resin (B)
(1) PA6T/6I: Polyamide 6T/6I copolymer (Grivory (registered trademark) G21 manufactured by EMS-CHEMIE (Japan) Co., Ltd., amino group concentration=38 μmol/g)
3. Polyalkylene glycol alkyl ether (C)
(1) Polyethylene glycol monomethyl ether (M-PEG CP2500 manufactured by DKS Co. Ltd.; number average molecular weight: 2,500)
4. Polyolefin wax (D)
(1) Polyethylene wax (Hi-WAX 320P manufactured by Mitsui Chemicals, Inc.; number average molecular weight: 3,000)
5. Other components (E)
(1) PA6 (2): Polyamide 6 (manufactured by Ube Industries, Ltd., amino group concentration=45 μmol/g)
(2) PA6 (3): Polyamide 6 (manufactured by Ube Industries, Ltd., amino group concentration=30 μmol/g)
(3) Carbon black (VULCAN P manufactured by CABOT)
(4) Hexamethylenediamine (manufactured by FUJIFILM Wako Pure Chemical Corporation)
(5) Phenolic antioxidant (Irganox 1098 manufactured by BASF Japan)
5. Acid-modified polyolefins
(1) Maleic anhydride-modified polyethylene (1)
Amount of acid modification: 16 μmol/g (titration method)
MFR: 0.6 g/10 min (190° C., 2,160 g)
Density: 0.93
Melting point: 128° C. (DSC method)
(2) Maleic anhydride-modified polyethylene (2)
Amount of acid modification: 38 μmol/g (titration method)
MFR: 0.6 g/10 min (190° C., 2,160 g)
Density: 0.94
Melting point: 128° C. (DSC method)

(3) Maleic anhydride-modified polyethylene (3)
Amount of acid modification: 15 µmol/g (titration method)
MFR: 0.2 g/10 min (190° C., 2,160 g)
Density: 0.94
Melting point: 127° C. (DSC method)
(4) Maleic anhydride-modified polyethylene (4)
Amount of acid modification: 4 µmol/g (titration method)
MFR: 0.3 g/10 min (190° C., 2,160 g)
Density: 0.94
Melting point: 127° C. (DSC method)
(5) Maleic anhydride-modified polyethylene (5)
Amount of acid modification: 7 µmol/g (titration method)
MFR: 3.2 g/10 min (190° C., 2,160 g)
Density: 0.92
Melting point: 118° C. (DSC method)
(6) Maleic anhydride-modified polyethylene (6)
Amount of acid modification: 0 µmol/g (titration method)
MFR: 0.3 g/10 min (190° C., 2,160 g)
Density: 0.95
Melting point: 134° C. (DSC method)

[Preparation of Polyamide Resin Composition Pellets]

The components described in Tables 1-1 and 1-2 were melt-kneaded with twin-screw kneader ZSK32 McPlus (manufactured by Coperion Corporation) having L/D of 48 and a screw diameter of 32 mm at a cylinder temperature of 250° C., a screw rotational speed of 200 rpm and a throughput of 50 kg/h to give pellets of a polyamide resin composition. The pellets obtained were used for the evaluation of "mechanical characteristics" below.

[Mechanical Characteristics]

(1) Tensile yield stress, nominal tensile strain at break, and tensile modulus

A type-A specimen was prepared from the pellets based on ISO 294-1 and was subjected to a tensile test in a 23° C. atmosphere based on ISO 527-1 and 2.

(2) Flexural strength and flexural modulus

A type-B specimen was prepared from the pellets based on ISO 294-1 and was subjected to a bending test in a 23° C. atmosphere based on ISO 178.

(3) Charpy impact strength

A type-B specimen was prepared from the pellets based on ISO 294-1 and was post-processed to form a V-notch based on ISO 179/leA. A Charpy impact test was carried out in a 23° C. atmosphere with a hammer capacity of 1 J.

(4) Deflection temperature under load

A type-B specimen was prepared from the pellets based on ISO 294-1 and was deflected to a prescribed amount under a load of 0.45 MPa while measuring the temperature based on ISO 75-2.

The material was evaluated as excellent in "mechanical characteristics" when the Charpy impact strength was 5.5 KJ/m$^2$ or above and the deflection temperature under load was 60° C. or above.

[Acid Modification Ratio of Acid-Modified Polyolefin]

Xylene was added to the acid-modified polyolefin and the mixture was stirred in an oil bath at 125° C. to form a solution. After the acid-modified polyolefin had been dissolved, an appropriate amount of thymol blue was added. A burette was set. Neutralization titration was performed using KOH to determine the acid modification ratio of the polyolefin.

[Test of Bonding Properties with Respect to Acid-Modified Polyolefin]

(1) Preparation of specimen

Figure 2:
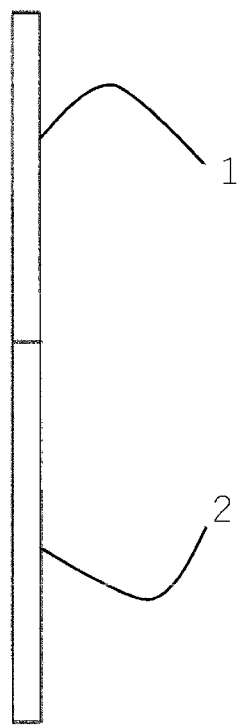
FIG. 2 is a side view illustrating the shape of a specimen evaluated in a test of bonding properties.

A two-color injection molded specimen (a specimen 1) having an ASTM No. 1 dumbbell specimen shape was obtained by steps 1 and 2 described below. Further, a fuel-immersed specimen (a specimen 2) was obtained by step 3 described below. FIG. 1 is a plan view illustrating the shape of the specimen for testing bonding properties, and FIG. 2 is a side view illustrating the shape of the specimen for testing bonding properties. Here, the specimen is composed of a part 1 (FIG. 1, FIG. 2: 1) and a part 2 (FIG. 1, FIG. 2: 2).

(1-1) Step 1

A metal piece having the shape of the part 2 illustrated in FIG. 1 was inserted into a mold, and the maleic anhydride-modified polyolefin was primarily molded using an injection molding machine (T-100D manufactured by FANUC CORPORATION, mold clamping force: 100 tons, screw diameter: 36 mm) at a cylinder temperature of 200° C., a mold temperature of 40° C. and an injection rate of 50 mm/sec. Thus, the maleic anhydride-modified polyolefin was molded into an article having the shape of the part 1.

(1-2) Step 2

The molded article of the maleic anhydride-modified polyolefin obtained in the step 1 was sufficiently preheated at 100° C. The metal insert having the shape of the part 2 was removed, and the molded article of the maleic anhydride-modified polyolefin was inserted into the mold. The polyamide resin composition was secondarily molded at a cylinder temperature of 290° C., a mold temperature of 90° C. and an injection rate of 100 mm/sec to form the shape of the part 2. A two-color injection-molded article (a specimen 1) was thus obtained. In the specimen 1, the interface between the part 1 (the molded article of the maleic anhydride-modified polyolefin) and the part 2 (the molded article of the polyamide resin composition) had been melt-welded at the time of injection of the polyamide resin composition.

(1-3) Step 3 The two-color injection-molded article (the specimen 1) was placed into an autoclave and was completely immersed in a Fuel C+10 vol % ethanol mixed fuel (isooctane:toluene:ethanol=45:45:10 (by volume)). The autoclave was then sealed. Immersion treatment was performed for 1 week or 3 weeks while heating the autoclave at 65° C. The molded article was taken out, and the chemical was wiped off. A fuel-immersed specimen (a specimen 2) was thus obtained.

(2) Properties Test

The specimen 2 was subjected to a tensile test at room temperature (23° C.), a test speed of 50 mm/sec and a distance between chucks of 140 mm to determine the elongation at break and the maximum stress at tensile yield. The values described in the table are each the average of the test results of three specimens.

The specimen was evaluated as excellent in bonding properties when the elongation at break of the specimen immediately after production was 20% or more, and the elongation at break of the specimen after the one-week immersion treatment was 20% or more.

[Calcium Chloride Resistance]

Type-A specimens obtained based on ISO 294-1 were pretreated in a thermostatic chamber controlled at 80° C.×90 RH % for 24 hours. The specimens were taken out, and gauze was placed on central portions of the specimens. A saturated aqueous calcium chloride solution was applied, and the specimens were allowed to stand at 100° C. for 2 hours. The appearance of the surfaces was observed. The specimen was evaluated as excellent in calcium chloride resistance when the appearance was good (rated as ○).

○: Good appearance

×: Poor appearance

[Fuel Permeability]

A planar specimen having a diameter of 75 mm and a thickness of 1 mm was molded using an injection molding machine and was tested in accordance with JIS Z0208 at a test temperature of 60° C. to measure the permeation of a Fuel C (SAE, J1681)+10 vol % ethanol mixed fuel (isooctane:toluene:ethanol=45:45:10 (by volume)). The permeation area was $1.13 \times 10^{-3}$ m$^2$ ($\varphi 3.8 \times 10^{-2}$ m). "Two" specimens were used to seal the test fuel, and "one" specimen was used as the control without sealing of the test fuel.

The fuel permeability of the polyamide resin composition of Example 2 was measured to be 2.7 g·mm/(m$^2$·24 hours).

The results are described in Tables 1-1 and 1-2. The unit for the composition in the table is mass %.

TABLE 1-1

|   |   |   |   | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| A | PA6(1) | Amino group concentration | 91 | 89.70 | 88.67 | 88.67 | 88.67 | 93.67 | 88.50 | 88.32 | 98.67 |
| B | PA6T/6I | ($\mu$mol/g) | 38 | 10.00 | 10.00 | 10.00 | 10.00 | 5.00 | 10.00 | 10.00 | 0.00 |
| C | Polyethylene glycol monomethyl ether | — | | 0.20 | 0.20 | 0.20 | 0.20 | 0.20 | 0.20 | 0.20 | 0.20 |
| D | Polyethylene wax | — | | 0.10 | 0.10 | 0.10 | 0.10 | 0.10 | 0.10 | 0.10 | 0.10 |
| E | PA6(2) | Amino group concentration | 45 | — | — | — | — | — | — | — | — |
|   | PA6(3) | ($\mu$mol/g) | 30 | — | — | — | — | — | — | — | — |
|   | Carbon black | — | | — | 1.00 | 1.00 | 1.00 | 1.00 | 1.00 | 1.00 | 1.00 |
|   | Hexamethylenediamine | — | | — | — | — | — | — | 0.17 | 0.35 | — |
|   | Phenolic antioxidant | — | | — | 0.03 | 0.03 | 0.03 | 0.03 | 0.03 | 0.03 | 0.03 |
|   | Total (mass %) | | | 100.00 | 100.00 | 100.00 | 100.00 | 100.00 | 100.00 | 100.00 | 100.00 |
| Mechanical characteristics | Tensile yield stress | | MPa | 80 | 84 | 84 | 84 | 82 | 84 | 84 | 81 |
|   | Nominal tensile strain at break | | % | 50 | 6 | 6 | 6 | 22 | 45 | 82 | 25 |
|   | Tensile modulus | | MPa | 2,760 | 2,710 | 2,710 | 2,710 | 2,710 | 2,710 | 2,720 | 2,740 |
|   | Flexural strength | | MPa | 110 | 114 | 114 | 114 | 111 | 111 | 110 | 109 |
|   | Flexural modulus | | MPa | 2,550 | 2,890 | 2,890 | 2,890 | 2,520 | 2,480 | 2,510 | 2,560 |
|   | Charpy impact strength | 1J, 23° C. (Notched) | kJ/m$^2$ | 7.5 | 7.0 | 7.0 | 7.0 | 7.1 | 6.9 | 5.5 | 7.1 |
|   | Deflection temperature under load | 0.45 MPa | ° C. | 85 | 90 | 90 | 90 | 113 | 124 | 106 | 154 |
|   | Rating | | — | ○ | ○ | ○ | ○ | ○ | ○ | ○ | ○ |
| Bonding properties with respect to acid-modified polyolefin | Amount of acid modification in polyolefin | | $\mu$mol/g | 16 | 16 | 38 | 15 | 16 | 16 | 16 | 16 |
|   | Tensile yield stress (n3) | Immediately after production | MPa | 14 | 14 | 17 | 17 | 15 | 14 | 14 | 15 |
|   |   | 1 week(168 h) | MPa | 12 | 11 | 14 | 14 | 12 | 12 | 12 | 11 |
|   |   | 3 week(504 h) | MPa | 11 | 11 | 13 | 12 | 11 | 11 | 11 | 11 |
|   | Elongation at break (n3) | Immediately after production | % | 55 | 43 | 55 | 49 | 53 | 43 | 33 | 45 |
|   |   | 1 week(168 h) | % | 44 | 39 | 55 | 20 | 40 | 42 | 27 | 37 |
|   |   | 3 week(504 h) | % | 35 | 38 | 31 | 15 | 37 | 39 | 25 | 30 |
|   | Rating | | — | ○ | ○ | ○ | ○ | ○ | ○ | ○ | ○ |
|   | Calcium chloride resistance | | — | ○ | ○ | ○ | ○ | ○ | ○ | ○ | ○ |

TABLE 1-2

|   |   |   |   | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| A | PA6(1) | Amino group concentration | 91 | 88.67 | 88.67 | 88.67 | 78.67 | — | — | 100.00 | — |
| B | PA6T/6I | ($\mu$mol/g) | 38 | 10.00 | 10.00 | 10.00 | 20.00 | 10.00 | 10.00 | — | — |
| C | Polyethylene glycol monomethyl ether | — | | 0.20 | 0.20 | 0.20 | 0.20 | 0.20 | 0.20 | 0.00 | 0.00 |
| D | Polyethylene wax | — | | 0.10 | 0.10 | 0.10 | 0.10 | 0.10 | 0.10 | 0.00 | 0.00 |
| E | PA6(2) | Amino group concentration | 45 | — | — | — | — | 88.67 | — | — | — |
|   | PA6(3) | ($\mu$mol/g) | 30 | — | — | — | — | — | 88.67 | — | — |
|   | Carbon black | — | | 1.00 | 1.00 | 1.00 | 1.00 | 1.00 | 1.00 | — | — |
|   | Hexamethylenediamine | — | | — | — | — | — | — | — | — | — |
|   | Phenolic antioxidant | — | | 0.03 | 0.03 | 0.03 | 0.03 | 0.03 | 0.03 | — | — |
|   | Total (mass %) | | | 100.00 | 100.00 | 100.00 | 100.00 | 100.00 | 100.00 | 100.00 | 100.00 |
| Mechanical characteristics | Tensile yield stress | | MPa | 84 | 84 | 84 | 87 | 85 | 84 | 78 | 77 |
|   | Nominal tensile strain at break | | % | 6 | 6 | 6 | 58 | 41 | 36 | 34 | 50 |
|   | Tensile modulus | | MPa | 2,710 | 2,710 | 2,710 | 2,560 | 2,690 | 2,720 | 2,900 | 2,850 |
|   | Flexural strength | | MPa | 114 | 114 | 114 | 99 | 112 | 110 | 106 | 105 |
|   | Flexural modulus | | MPa | 2,890 | 2,890 | 2,890 | 2,410 | 2,430 | 2,450 | 2,600 | 2,600 |
|   | Charpy impact strength | 1J, 23° C. (Notched) | kJ/m$^2$ | 7.0 | 7.0 | 7.0 | 4.9 | 5.8 | 6.9 | 5.0 | 5.2 |
|   | Deflection temperature under load | 0.45 MPa | ° C. | 90 | 90 | 90 | 54 | 102 | 98 | 155 | 150 |
|   | Rating | | — | ○ | ○ | ○ | x | ○ | ○ | x | x |
| Bonding properties with respect to acid-modified polyolefin | Amount of acid modification in polyolefin | | $\mu$mol/g | 4 | 7 | 0 | 16 | 16 | 16 | 16 | 16 |
|   | Tensile yield stress (n3) | Immediately after production | MPa | 17 | 10 | Peeled | 14 | 14 | 15 | 15 | 15 |
|   |   | 1 week(168 h) | MPa | 13 | 7 | — | 12 | 11 | 11 | 12 | 12 |
|   |   | 3 week(504 h) | MPa | 12 | 6 | — | 11 | 11 | 9 | 11 | 11 |

TABLE 1-2-continued

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Elongation at break (n3) | Immediately after production | % | 17 | 24 | Peeled | 41 | 39 | 7 | 65 | 45 |
|  | 1 week(168 h) | % | 7 | 11 | — | 26 | 19 | 8 | 48 | 18 |
|  | 3 week(504 h) | % | 5 | 12 | — | 21 | 16 | 6 | 31 | 8 |
| Rating |  | — | x | x | x | ○ | x | x | ○ | x |
| Calcium chloride resistance |  | — | ○ | ○ | ○ | ○ | ○ | ○ | x | x |

As is clear from the results described in Tables 1-1 and 1-2, the polyamide resin compositions of Examples were excellent in mechanical characteristics, bonding properties and calcium chloride resistance.

Comparative Examples 1 to 3 resulted in poor bonding properties because the amount of acid modification of the acid-modified polyolefin was less than 8 μmol/g.

The resin composition of Comparative Example 4 was poor in mechanical properties because the aliphatic polyamide resin contained more than 18 mass % of the aromatic polyamide resin (B).

The resin compositions of Comparative Examples 5 and 6 were inferior in bonding properties because the aliphatic polyamide resin contained therein had an amino group concentration of less than 46 μmol/g.

The resin composition of Comparative Example 7 was consequently poor in mechanical properties and calcium chloride resistance, because the aliphatic polyamide resin did not contain any of the polyalkylene glycol alkyl ether (C) and the polyolefin wax (D).

The resin composition of Comparative Example 8 was inferior in mechanical characteristics, bonding properties and calcium chloride resistance because the aliphatic polyamide resin contained therein had an amino group concentration of less than 46 μmol/g, and the polyalkylene glycol alkyl ether (C) and the polyolefin wax (D) were absent.

REFERENCE SIGNS LIST

1: Part 1
2: Part 2

The invention claimed is:

1. A molded article comprising a polyamide resin composition and an acid-modified polyolefin, wherein at least part of the polyamide resin composition and at least part of the acid-modified polyolefin are bonded to each other, and
wherein the polyamide resin composition comprises 70 to 99 mass % of an aliphatic polyamide resin (A) having an amino group concentration of 46 to 110 μmol/g, 0 to 18 mass % of an aromatic polyamide resin (B), 0.01 to 0.50 mass % of a polyalkylene glycol alkyl ether (C), 0.01 to 0.50 mass % of a polyolefin wax (D) and 0 to 22.98 mass % of a component (E) other than (A) to (D), and the total amount of (A) to (E) is 100 mass %, and wherein the amount of acid modification of the acid-modified polyolefin is 8 to 100 μmol/g.

2. The molded article according to claim 1, wherein a two-color molded article (2) has an elongation at break of 20% or more, and the two-color molded article (2) is obtained through the following steps 1 to 3:
step 1: injection-molding the acid-modified polyolefin having the amount of acid modification of 15 μmol/g to obtain a part 1, wherein a cylinder temperature is 200° C. and a mold temperature is 40° C.,
step 2: heating the part 1 obtained in the step 1 to 100° C., introducing the part 1 into a mold, and subsequently injection-molding the polyamide resin composition to obtain a two-color molded article (1), wherein a cylinder temperature is 290° C. and a mold temperature is 90° C., and
step 3: immersing the two-color molded article (1) obtained in the step 2 in an isooctane/toluene/ethanol mixed solution at 65° C. for 1 week to obtain the two-color molded article (2), wherein the volume ratio of isooctane: toluene: ethanol of the mixed solution is 45:45:10.

3. The molded article according to claim 1, wherein a two-color molded article (2') has an elongation at break of 15% or more, and the two-color molded article (2') is obtained through the following steps 1, 2 and 3':
step 1: injection-molding the acid-modified polyolefin having the amount of acid modification of 15 μmol/g to obtain a part 1, wherein a cylinder temperature is 200° C. and a mold temperature is 40° C.,
step 2: heating the part 1 obtained in the step 1 to 100° C., introducing the part 1 into a mold, and subsequently injection-molding the polyamide resin composition to obtain a two-color molded article (1), wherein a cylinder temperature is 290° C. and a mold temperature is 90° C.;
step 3': immersing the two-color molded article (1) obtained in the step 2 in an isooctane/toluene/ethanol mixed solution at 65° C. for 3 weeks to obtain the two-color molded article (2'), wherein the volume ratio of isooctane: toluene: ethanol of the mixed solution is 45:45:10.

4. The molded article according to claim 1, wherein the aliphatic polyamide resin (A) is an aliphatic homopolyamide resin (A-1).

5. The molded article according to claim 1, wherein the aromatic polyamide resin (B) is an aromatic copolyamide resin.

6. The molded article according to claim 1, wherein the polyalkylene glycol alkyl ether (C) is polyethylene glycol monomethyl ether.

7. The molded article according to claim 1, wherein a number average molecular weight of the polyolefin wax (D) is 1,000 to 5,000.

8. The molded article according to claim 1, wherein the amino group concentration of the aliphatic polyamide resin (A) is 80 to 99 μmol/g.

9. The molded article according to claim 1, wherein the amount of acid modification of the acid-modified polyolefin is 12 to 40 μmol/g.

10. A part which is placed in contact with a fuel, wherein the part comprises the molded article according to claim 1.

* * * * *